US012221129B2

(12) United States Patent
Fujimoto et al.

(10) Patent No.: US 12,221,129 B2
(45) Date of Patent: Feb. 11, 2025

(54) CONTROL DEVICE, CONTROL METHOD, AND STORAGE MEDIUM

(71) Applicant: HONDA MOTOR CO., LTD., Tokyo (JP)

(72) Inventors: Gakuyo Fujimoto, Wako (JP); Yuji Yasui, Wako (JP); Takashi Matsumoto, Wako (JP); Hideki Matsunaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 204 days.

(21) Appl. No.: 18/098,731

(22) Filed: Jan. 19, 2023

(65) Prior Publication Data

US 2023/0234609 A1  Jul. 27, 2023

(30) Foreign Application Priority Data

Jan. 21, 2022  (JP) ................. 2022-007776

(51) Int. Cl.
*B60W 30/09* (2012.01)
*B60W 30/095* (2012.01)
*B60W 60/00* (2020.01)
*G06V 20/56* (2022.01)

(52) U.S. Cl.
CPC ...... *B60W 60/001* (2020.02); *B60W 30/0956* (2013.01); *G06V 20/56* (2022.01); *B60W 2554/4041* (2020.02); *B60W 2554/80* (2020.02)

(58) Field of Classification Search
CPC .......... B60W 60/001; B60W 30/0956; B60W 2554/4041; B60W 2554/80; G06V 20/56
See application file for complete search history.

(56) References Cited

FOREIGN PATENT DOCUMENTS

| JP | 2020-102086 | 7/2020 |
|---|---|---|
| JP | 2020-189536 | 11/2020 |
| JP | 2020-197770 | 12/2020 |

OTHER PUBLICATIONS

Japanese Office Action for Japanese Patent Application No. 2022-007776 mailed Jul. 11, 2023.

*Primary Examiner* — Mathew Franklin Gordon
(74) *Attorney, Agent, or Firm* — Amin, Turocy & Watson, LLP

(57) ABSTRACT

A control device mounted on a mobile object acquires surrounding situation information indicating a surrounding situation of a mobile object recognized by an object recognition device mounted on the mobile object, detects a predetermined reference object present in a traveling direction of the mobile object on the basis of the surrounding situation information, identifies a travelable area of the mobile object on the basis of the surrounding situation information, controls traveling of the mobile object such that the mobile object travels in the travelable area, causes the mobile object to move closer to the reference object when the reference object is detected, and detects an accompanying object accompanying the reference object on the basis of the surrounding situation information recognized by the object recognition device after the mobile object moves closer to the reference object, and identifying the travelable area by excluding the reference object and the accompanying object.

10 Claims, 9 Drawing Sheets

110

CONTROL DEVICE, CONTROL METHOD, AND STORAGE MEDIUM

CROSS-REFERENCE TO RELATED APPLICATION

Priority is claimed on Japanese Patent Application No. 2022-007776, filed Jan. 21, 2022, the content of which is incorporated herein by reference.

BACKGROUND

Field of the Invention

The present invention relates to a control device, a control method, and a storage medium.

Description of Related Art

Conventionally, an invention of a single riding electric vehicle that can move on a sidewalk has been disclosed (Japanese Unexamined Patent Application, First Publication No. 2020-189536).

In the conventional technology, there were cases in which processing related to detection of an object in the vicinity of a mobile object was not sufficiently considered.

SUMMARY

The present invention has been made in consideration of such circumstances, and one object is to provide a control device, a control method, and a storage medium that can perform assistance in detecting an object with higher accuracy.

The control device, the control method, and the storage medium according to the present invention have adopted the following configuration.

(1): A control device according to one aspect of the present invention includes a storage medium configured to store an instruction readable by a computer, and a processor connected to the storage medium, in which the processor executes the instruction readable by the computer, thereby acquiring surrounding situation information indicating a surrounding situation of a mobile object recognized by an object recognition device mounted on the mobile object, detecting a predetermined reference object present in a traveling direction of the mobile object on the basis of the surrounding situation information, identifying a travelable area of the mobile object on the basis of the surrounding situation information, controlling traveling of the mobile object such that the mobile object travels in the travelable area, causing the mobile object to move closer to the reference object when the reference object is detected, and detecting an accompanying object accompanying the reference object on the basis of the surrounding situation information recognized by the object recognition device after the mobile object moves closer to the reference object, and identifying the travelable area by excluding the reference object and the accompanying object.

(2): In the aspect of (1) described above, when the reference object is detected and the accompanying object is present, the processor causes the mobile object to move to the vicinity of the reference object, which is a distance range in which the accompanying object is recognizable by the object recognition device by using the reference object as a reference position.

(3): In the aspect of (1) described above, the reference object is at least two objects that are installed on a ground on which the mobile object travels, whose difference in height is within a predetermined value, and whose heights are equal to or greater than a threshold value.

(4): In the aspect of (3) described above, when at least two objects whose difference in height is within a predetermined value and whose heights are equal to or greater than a threshold value are detected as the reference object, the processor causes the mobile object to move closer to the reference object, and the processor identifies the travelable area on the basis of surrounding recognition information obtained by recognizing a space between the at least two or more objects at a position to which the mobile object has moved closer to the reference object.

(5): In the aspect of (4) described above, when at least two or more objects whose difference in height is within a predetermined value and whose heights are equal to or greater than a threshold value are detected as the reference object, the processor causes the mobile object to move closer to the reference object such that it is oriented obliquely with respect to an extending direction of the accompanying object, which is assumed to be present between the two or more objects.

(6): In the aspect of (1) described above, the reference object is a suspension which is installed on the ground on which the mobile object travels and has a height equal to or higher than a height of the mobile object.

(7): In the aspect of (6) described above, when a suspension having a height equal to or higher than the height of the mobile object is detected as the reference object, the processor identifies the travelable area on the basis of surrounding recognition information obtained by recognizing a hollow space of the suspension at a position to which the mobile object has moved closer to the reference object.

(8): In the aspect of (1) described above, when the reference object is detected and map information held by the mobile object shows that a detection position of the reference object matches a boundary position of a plurality of areas indicated by the map information, the processor causes the mobile object to move closer to the reference object.

(9): A control method according to another aspect of the present invention includes, by a computer, processing of acquiring surrounding situation information indicating a surrounding situation of a mobile object recognized by an object recognition device mounted on the mobile object, processing of detecting a predetermined reference object present in a traveling direction of the mobile object on the basis of the surrounding situation information, processing of identifying a travelable area of the mobile object on the basis of the surrounding situation information, processing of controlling traveling of the mobile object such that the mobile object travels in the travelable area, processing of causing the mobile object to move closer to the reference object when the reference object is detected, and processing of detecting an accompanying object accompanying the reference object on the basis of the surrounding situation information recognized by the object recognition device after the mobile object moves closer to the reference object, and identifying the travelable area by excluding the reference object and the accompanying object.

(10): A computer-readable non-transitory storage medium according to still another aspect of the present invention stores a program causing a computer to execute processing of acquiring surrounding situation information indicating a surrounding situation of a mobile object recognized by an object recognition device mounted on the mobile object, processing of detecting a predetermined reference object present in a traveling direction of the mobile object on the basis of the surrounding situation information, processing of identifying a travelable area of the mobile object on the basis of the surrounding situation information, processing of controlling traveling of the mobile object such that the mobile object travels in the travelable area, processing of causing the mobile object to move closer to the reference object when the reference object is detected, and processing of detecting an accompanying object accompanying the reference object on the basis of the surrounding situation information recognized by the object recognition device after the mobile object moves closer to the reference object, and identifying the travelable area by excluding the reference object and the accompanying object.

According to the aspects of (1) to (10), it is possible to perform assistance in detecting an object with higher accuracy.

DESCRIPTION OF EMBODIMENTS

Hereinafter, an embodiment of a control device mounted on a mobile object of the present invention, a control method, and a storage medium will be described with reference to the drawings. A mobile object moves both on a roadway and in a predetermined area other than a roadway. The predetermined area is, for example, a sidewalk. In addition, the predetermined area may be a part or all of a roadside strip, a bike lane, an open space, and the like, or may include all of a sidewalk, a roadside strip, a bike lane, an open space, and the like. In the following description, it is assumed that the predetermined area is a sidewalk. In the following description, a part described as "sidewalk" can be appropriately read as a "predetermined area."

Hereinafter, a forward direction of the mobile object may be referred to as a plus X direction, a rearward direction of the mobile object may be referred to as a minus X direction, a right direction orthogonal to the front-back direction (a right direction when facing in the plus X direction) may be referred to as a plus Y direction, a left direction orthogonal to the front-back direction (a left direction when facing in the plus X direction) may be referred to as a minus Y direction, a vertically upward direction orthogonal to the X direction and the Y direction may be referred to as a plus Z direction, and a vertically downward direction orthogonal to the X direction and the Y direction may be referred to as a minus Z direction.

Embodiment

Figure 1:
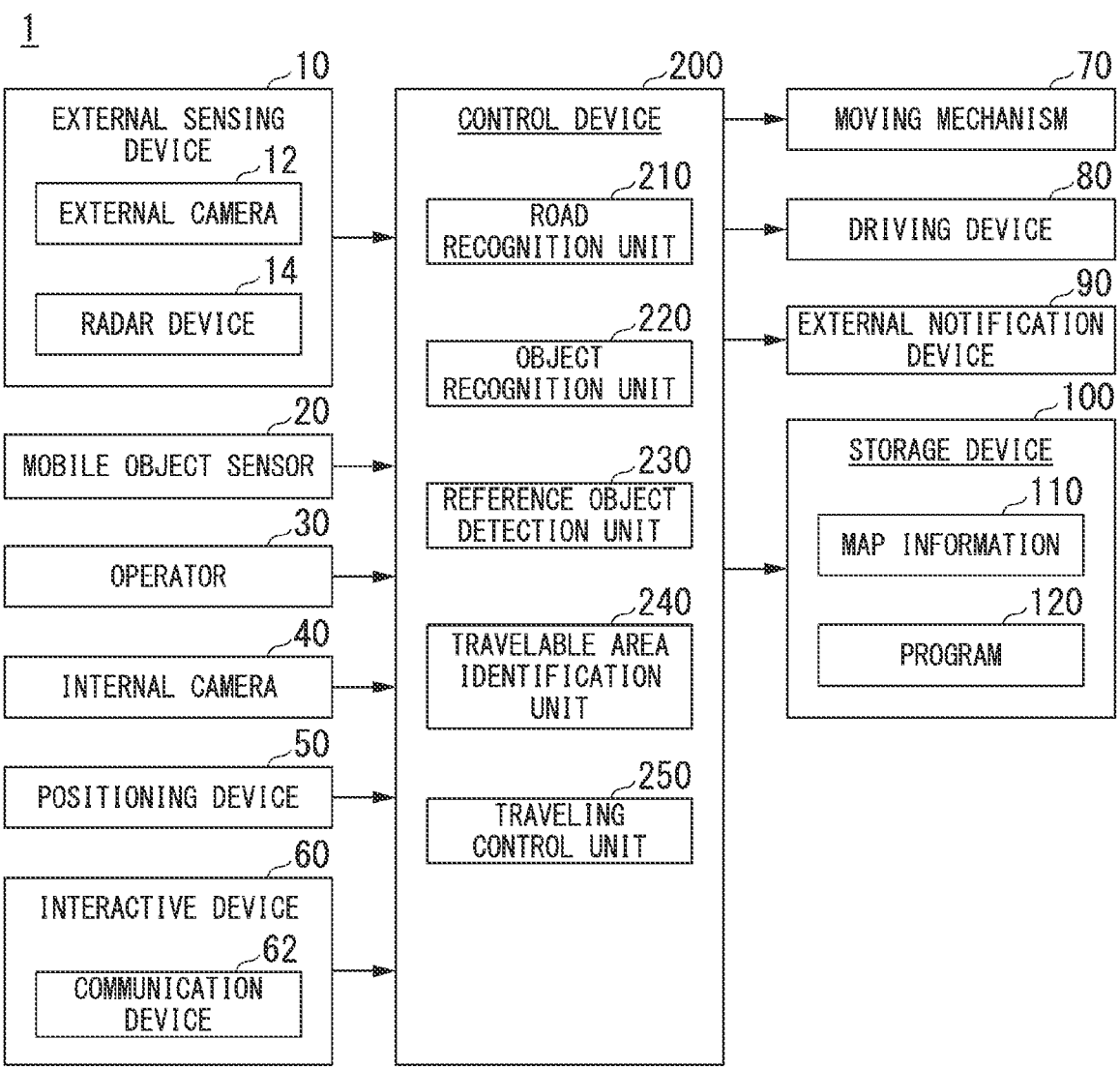
FIG. 1 is a diagram which shows an example of a configuration of a mobile object and a control device according to an embodiment.

FIG. 1 is a diagram which shows an example of a configuration of a mobile object 1 and a control device 200 according to an embodiment. The mobile object 1 includes, for example, an external sensing device 10, a mobile object sensor 20, an operator 30, an internal camera 40, a positioning device 50, an interactive device 60, a moving mechanism 70, a driving device 80, an external notification device 90, a storage device 100, and a control device 200 mounted thereon. Note that some of these constituents that are not necessary for realizing functions of the present invention may be omitted.

The external sensing device 10 is any of various types of devices whose sensing range is a traveling direction of the mobile object 1. The external sensing device 10 includes, for example, an external camera 12 and a radar device 14. The external camera 12 is, for example, a digital camera using a solid-state imaging device such as a charge coupled device (CCD) or complementary metal oxide semiconductor (CMOS). The external camera 12 is attached to a position at which at least the traveling direction of the mobile object 1 can be captured and, for example, periodically and repeatedly captures images of surroundings of the host vehicle M. The external camera 12 may be a stereo camera. The radar device 14 emits radio waves such as millimeter waves in the vicinity of the mobile object 1 and detects radio waves reflected by an object (reflected waves) to detect at least a position (distance to and direction) of the object.

Furthermore, the external sensing device 10 may include, for example, light detection and ranging (LIDAR) sensor. The external sensing device 10 performs sensor fusion processing on results of the detection by some or all of the external camera 12, the radar device 14, and the LIDAR, and recognizes the position, type, speed, and the like of an object present in the vicinity of the mobile object 1. The external sensing device 10 outputs a result of the recognition to the control device 200. The external sensing device 10 may output the results of the detection by the external camera 12, the radar device 14, and the LIDAR to the control device 200 as they are. The external sensing device 10 is an example of an "object recognition device," and the result of the recognition is an example of "surrounding situation information."

The mobile object sensor 20 includes, for example, a speed sensor, an acceleration sensor, a yaw rate (angular speed) sensor, an orientation sensor, and an operation amount detection sensor attached to the operator 30. The operator 30 includes, for example, an operator for instructing acceleration or deceleration (such as an accelerator pedal and a brake pedal) and an operator for instructing steering (such as a steering wheel). In this case, the mobile object sensor 20 may include an accelerator opening sensor, a brake depression amount sensor, a steering torque sensor, and the like. The mobile object 1 may include an operator of a form other than those described above as the operator 30 (for example, a non-circular rotating operator, a joystick, a button, or the like).

The internal camera 40 captures at least an image of the head of an occupant of the mobile object 1 from the front.

The internal camera 40 is a digital camera using an imaging device such as a charge coupled device (CCD) or complementary metal oxide semiconductor (CMOS). The internal camera 40 outputs the captured image to the control device 200.

The positioning device 50 is a device for measuring the position of the mobile object 1. The positioning device 50 is, for example, a global navigation satellite system (GNSS) receiver, identifies the position of the mobile object 1 on the basis of a signal received from a GNSS satellite, and outputs it as positional information. Note that positional information of the mobile object 1 may be estimated based on a position of a Wi-Fi base station to which a communication device (to be described below) is connected.

The interactive device 60 includes, for example, a speaker, a microphone, a touch panel, a communication device 62, and the like. The interactive device 60 appropriately processes voice of the occupant received by a microphone, transmits it to a server device via a network by the communication device 62, and provides information by voice from the speaker on the basis of the information returned from the server device. The interactive device 60 may also be called an agent device, a concierge device, an assistance device, or the like. The server device has a voice recognition function, a natural language processing function, a semantic interpretation function, a reply content determination function, and the like. In addition, the interactive device 60 transmits the positional information to the server device, and the server device may return information on a corresponding facility according to the positional information and a guidance request issued by the occupant (for example, "Is there a good ramen restaurant around here?"). In this case, the interactive device 60 provides voice guidance such as "turn left ahead." Not limited to this, the interactive device 60 has a function of receiving natural speech of the occupant and replying with an appropriate reply. In addition, the interactive device 60 has a function of conducting a simple dialogue, such as asking a question from the device side and receiving a reply, without going through the server device, and may ask the occupant a question or the like according to a request from the control device 200.

The moving mechanism 70 is a mechanism for causing the mobile object 1 to move on a road. The moving mechanism 70 is, for example, a wheel group including steering wheels and driving wheels. In addition, the moving mechanism 70 may be legs for multi-pedal walking.

The driving device 80 outputs force to the moving mechanism 70 to cause the mobile object 1 to move. For example, the driving device 80 includes a motor that drives the driving wheels, a battery that stores power to be supplied to the motor, a steering device that adjusts a steering angle of the steering wheels, and a brake device controlled according to information input from the control device 200 or information input from the operator 30. The driving device 80 may include an internal combustion engine, a fuel cell, or the like as a driving force output device or a power generation device.

The external notification device 90 is, for example, a lamp, a display device, a speaker, or the like which is provided on an outer plate of the mobile object 1 and is for notifying information to the outside of the mobile object 1. The external notification device 90 operates differently depending on whether the mobile object 1 is moving on a sidewalk or on a roadway. For example, the external notification device 90 is controlled such that it lights the lamp when the mobile object 1 is moving on the sidewalk and does not light the lamp when the mobile object 1 is moving on the roadway. It is preferable that a color of light emitted from this lamp is a color stipulated by law. The external notification device 90 may be controlled such that it causes the lamp to emit green light when the mobile object 1 is moving on the sidewalk, and causes the lamp to emit blue light when the mobile object 1 is moving on the roadway. When the external notification device 90 is a display device, the external notification device 90 displays "the mobile object 1 is traveling on the sidewalk" using text or graphics when the mobile object 1 is traveling on the sidewalk.

Figure 2:
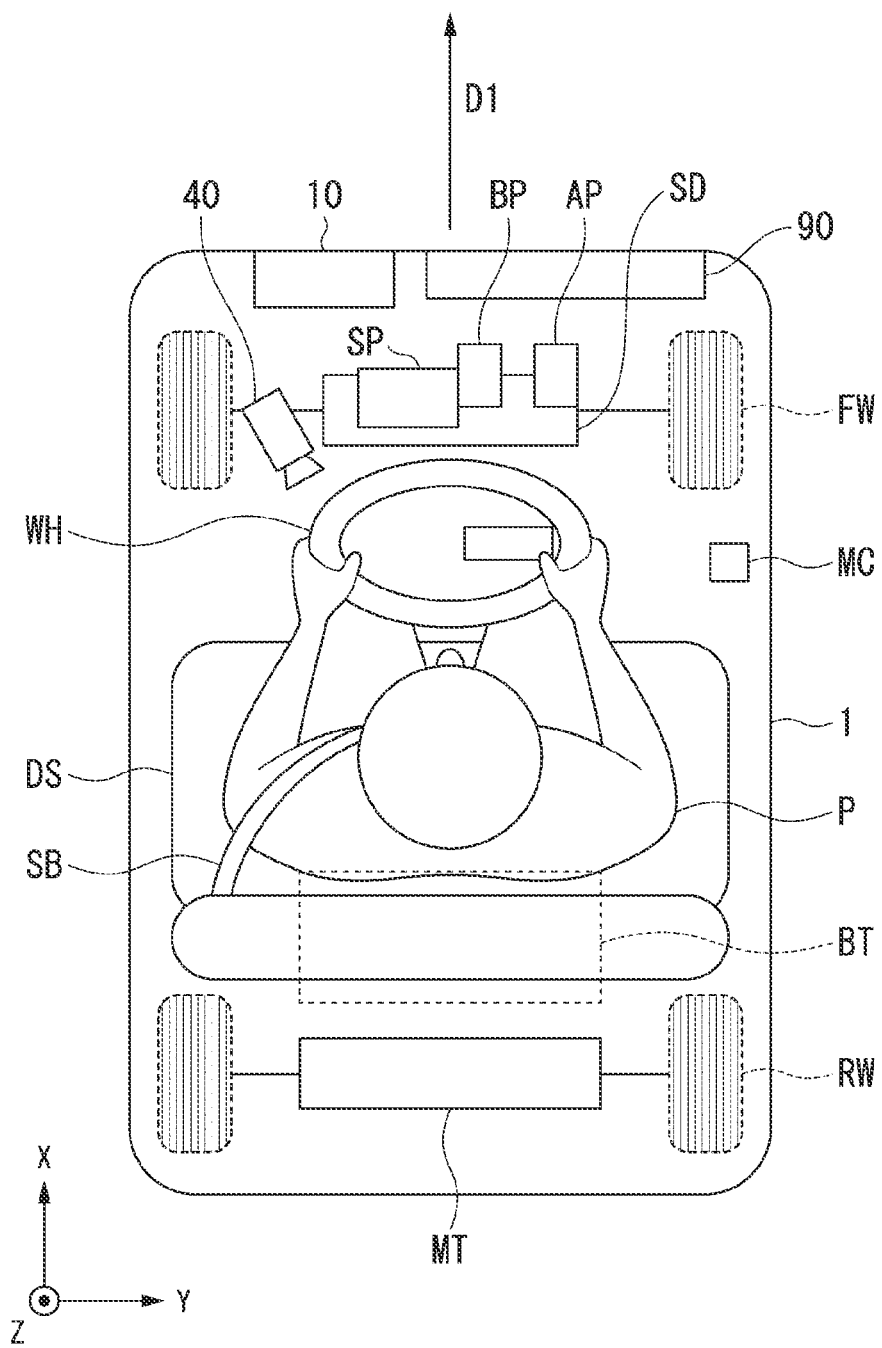
FIG. 2 is a perspective view of a mobile object from above.

FIG. 2 is a perspective view of the mobile object 1 as viewed from above. In FIG. 2, FW is a steering wheel, RW is a driving wheel, SD is a steering device, MT is a motor, and BT is a battery. The steering device SD, the motor MT, and the battery BT are included in the driving device 80. In addition, AP is an accelerator pedal, BP is a brake pedal, WH is a steering wheel, SP is a speaker, and MC is a microphone. The shown mobile object 1 is a single riding mobile object, and an occupant P is seated on a driver's seat DS and wearing a seat belt SB. An arrow D1 is the traveling direction (speed vector) of the mobile object 1. The external sensing device 10 is provided near a front end of the mobile object 1, and the internal camera 40 is provided at a position where an image of the head of the occupant P can be captured from the front of the occupant P. In addition, the external notification device 90 is provided near the front end of the mobile object 1 as a display device.

Returning to FIG. 1, the storage device 100 is, for example, a non-transitory storage device such as a hard disk drive (HDD), a flash memory, or a random access memory (RAM). The storage device 100 stores map information 110, a program 120 executed by the control device 200, and the like. Although the storage device 100 is shown outside a frame of the control device 200 in FIG. 1, the storage device 100 may be included in the control device 200.

[Control Device]

The control device 200 includes, for example, a road recognition unit 210, an object recognition unit 220, a reference object detection unit 230, a travelable area identification unit 240, and a traveling control unit 250. The road recognition unit 210, the object recognition unit 220, the reference object detection unit 230, the travelable area identification unit 240, and the traveling control unit 250 are realized by, for example, a hardware processor such as a central processing unit (CPU) executing a program (software). Some or all of these components may be realized by hardware (a circuit unit; including circuitry) such as large scale integration (LSI), an application specific integrated circuit (ASIC), a field-programmable gate array (FPGA), and a graphics processing unit (GPU), or by software and hardware in cooperation. The program may be stored in a storage device (not shown) in advance, or may be stored in a detachable storage medium (non-transitory storage medium) such as a DVD or CD-ROM and be installed on a storage device by the storage medium being attached to a drive device.

The road recognition unit 210 recognizes whether the mobile object 1 is moving on a roadway or a sidewalk. The road recognition unit 210 analyzes, for example, an image captured by the external camera 12 of the external sensing device 10 to recognize whether the mobile object 1 is moving on a roadway or a sidewalk. Examples of image analysis include semantic segmentation. The road recognition unit 210 classifies each pixel in an image frame into a class (a roadway, a sidewalk, a boundary, an object, and the like) to assign a label thereto, recognizes that mobile object 1 is moving on a roadway when there are many pixels labeled as a roadway in an area corresponding to the front of the mobile object 1, and recognizes that the mobile object 1 is moving on a sidewalk when there are many pixels labeled as a sidewalk in the area corresponding to the front of the mobile object 1 in the image. Instead of being limited to this, the road recognition unit 210 may recognize that the mobile object 1 is moving on a roadway when a vehicle is recognized in the area corresponding to the front of the mobile object 1 in the image, and recognize that the mobile object 1 is moving on a sidewalk when a pedestrian is recognized in the area corresponding to the front of the mobile object 1 in the image. In addition, the road recognition unit 210 may recognize that the mobile object 1 is moving on a roadway when a width of a road surface area in the area corresponding to the front of the mobile object 1 in the image is large, and may also recognize that the mobile object 1 is moving on a sidewalk when the width of the road surface area in the area corresponding to the front is small. Moreover, the road recognition unit 210 may collate the positional information of the mobile object 1 with the map information 110 to recognize whether the mobile object 1 is moving on a roadway or moving on a sidewalk. The map information in this case must have accuracy to the extent that a sidewalk and a road can be distinguished based on position coordinates. When a "predetermined area" is not limited to a sidewalk, the road recognition unit 210 performs similar processing on a roadside strip, a bike lane, a public open space, and the like.

The object recognition unit 220 recognizes objects present in the vicinity of the mobile object 1 on the basis of an output of the external sensing device 10. Objects include some or all of mobile objects such as vehicles, bicycles, and pedestrians, traveling road boundaries such as road division lines, steps, guardrails, road shoulders, and median strips, structures installed on a road such as road signs and billboards, falling objects present (falling) on a traveling road, and obstacles such as objects present in the traveling direction of the mobile object 1. The object recognition unit 220 may also acquire, for example, presence or absence, positions, types, and the like of other mobile objects by inputting the image captured by the external camera 12 to a learned model that is learned to output information such as the presence or absence, positions, and types of objects, when the image captured by the external camera 12 of the external sensing device 10 is input. The types of other mobile objects can also be estimated on the basis of a size in the image, an intensity of reflected waves received by the radar device of the external sensing device 10, and the like. In addition, the object recognition unit 220 may acquire, for example, the speed of other mobile objects detected by the radar device using Doppler shift or the like. Moreover, the object recognition unit 220 may recognize obstacles on the basis of information input by the LIDAR 12. The object recognition unit 220 may be included in an external detection device instead of the control device 200. The object recognition unit 220 is an example of a "surrounding situation acquisition unit."

Details of the reference object detection unit 230 will be described below.

The travelable area identification unit 240 identifies a travelable area of the mobile object 1 on the basis of the surrounding situation information acquired by the object recognition unit 220. More specifically, the travelable area identification unit 240 identifies the travelable area of the mobile object 1 by excluding the object recognized by the object recognition unit 220 from an area of the image captured by the external camera 12. An arbitrary threshold value (for example, 5 cm or more) may be set for the object excluded at this time with respect to height or volume.

For example, the traveling control unit 250 generates a trajectory by referring to information on the traveling road based on an output of the road recognition unit 210 and information on the travelable area based on an output of the travelable area identification unit 240, and controls the driving device 80 such that the mobile object 1 travels automatically along the generated trajectory. The trajectory is a trajectory along which the mobile object 1 will automatically travel in the future (without depending on an operation of the driver). The trajectory includes, for example, speed elements. For example, a trajectory is expressed as a sequence of trajectory points to be reached by the mobile object 1. The trajectory point is a point to be reached by the mobile object 1 for each predetermined travel distance (for example, about several [m]) on a road distance, and separately from this, a target speed and a target acceleration are generated as part of a target trajectory for each predetermined sampling time (for example, about several tenths of a [sec]). In addition, the trajectory point may be a position to be reached by the mobile object 1 at a corresponding time for each predetermined sampling time. In this case, information on the target speed and the target acceleration is expressed by trajectory point intervals.

For example, when the mobile object 1 moves on a roadway, the traveling control unit 250 maintains a distance to an object present in the vicinity of the mobile object 1 at a first distance or more, and controls the motor MT, a brake device, or an operating device of the driving device 80 such that the mobile object 1 moves. When the mobile object 1 moves on a sidewalk, the traveling control unit 250 maintains a distance from an object in front of the mobile object 1 at a second distance or more, and controls the motor MT, the brake device, and the operating device of the driving device 80 such that the mobile object 1 moves. The second distance is, for example, a distance longer than the first distance. When the mobile object 1 is moved by an operation of the driver, the traveling control unit 250 controls the driving device 80 on the basis of an operation of the user on an operator to cause the mobile object 1 to move in a manner according to the operation.

In this manner, the object recognition unit 220 detects an object on the basis of the image captured by the external camera 12 and intensity of reflected waves received by the radar device 14, and the travelable area identification unit 240 identifies a travelable area by excluding the object recognized by the object recognition unit 220 from an area of the image captured by the external camera 12, and the traveling control unit 250 controls the mobile object 1 such that it travels in the identified travelable area. However, the object recognition unit 220 cannot recognize the object in some cases due to the small number of pixels represented in the image captured by the external camera 12 or the small intensity of the reflected waves depending on the type and shape of the object. As a result, the travelable area identification unit 240 identifies an area including the object as a travelable area, and the mobile object 1 may collide with the object.

Figure 3:
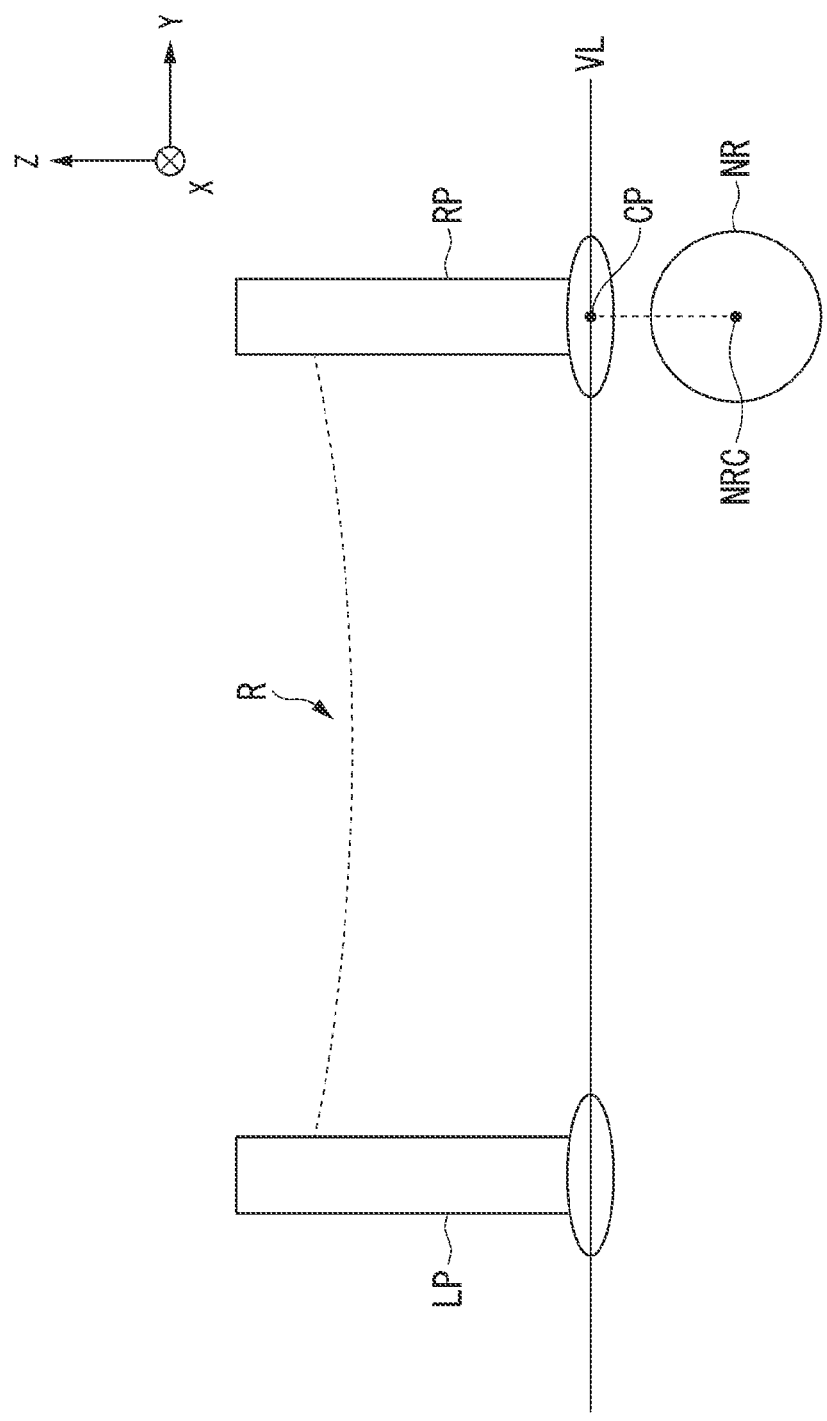
FIG. 3 is a diagram which shows an example of a situation in which object recognition by an object recognition unit fails.

FIG. 3 is a diagram which shows an example of a situation in which object recognition by the object recognition unit 220 fails. FIG. 3 shows an example in which a horizontally long object R, such as a rope or a chain, which has a short vertical width (that is, is thin) is hung from two poles LP and RP in the traveling direction in which the mobile object 1 travels. At this time, the object recognition unit 220 may not be able to recognize the object R due to the small number of pixels of the object R in the image captured by the external camera 12 and the small intensity of reflected waves reflected by the object R in some cases.

With the circumstances described above as background, the reference object detection unit 230 detects a predetermined reference object present in the traveling direction of the mobile object 1 on the basis of the surrounding situation information recognized by the object recognition unit 220. More specifically, for example, the reference object detection unit 230 detects two or more objects whose difference in height is within a predetermined value and whose heights are equal to or greater than a threshold value as reference objects. Alternatively, the reference object detection unit 230 may collate reference images such as poles and pylons stored in advance in the storage device 100 with the image captured by the external camera 12 and execute pattern matching processing to detect a reference object. A pole or a pylon is an example of a "reference object," and a rope or a chain is an example of an "accompanying object."

When the reference object detection unit 230 detects a reference object, the traveling control unit 250 causes the mobile object 1 to move to the vicinity of the detected reference object (that is, to move closer to the detected reference object). For example, in the case of FIG. 3, the traveling control unit 250 first draws a virtual line VL that passes through the poles LP and RP, which are the detected reference objects, and causes the mobile object 1 to move to a neighboring area NR including a point NRC where a line segment (for example, 3 m) orthogonal to the virtual line VL is drawn from a center CP of the pole LP (or pole RP) on the ground to the mobile object 1 side.

When the mobile object 1 moves to the neighboring area NR, the object recognition unit 220 recognizes an object again on the basis of the image captured by the external camera 12 after the mobile object 1 moves and the intensity of the reflected waves received by the radar device 14. In the case of FIG. 3, for example, the object recognition unit 220 uses the external camera 12 to capture an image of a space between the left pole LP and the right pole RP, or uses the radar device 14 to emit radio waves toward the space between the left poles LP and the right pole RP. More accurately, while the traveling control unit 250 causes the mobile object 1 to move to the neighboring area NR so that it is oriented obliquely with respect to an extending direction of the object, which is assumed to be present between the left pole LP and the right pole RP, the object recognition unit 220 captures the image of the space between the left pole LP and the right pole RP, or emits radio waves toward the space.

Figure 4:
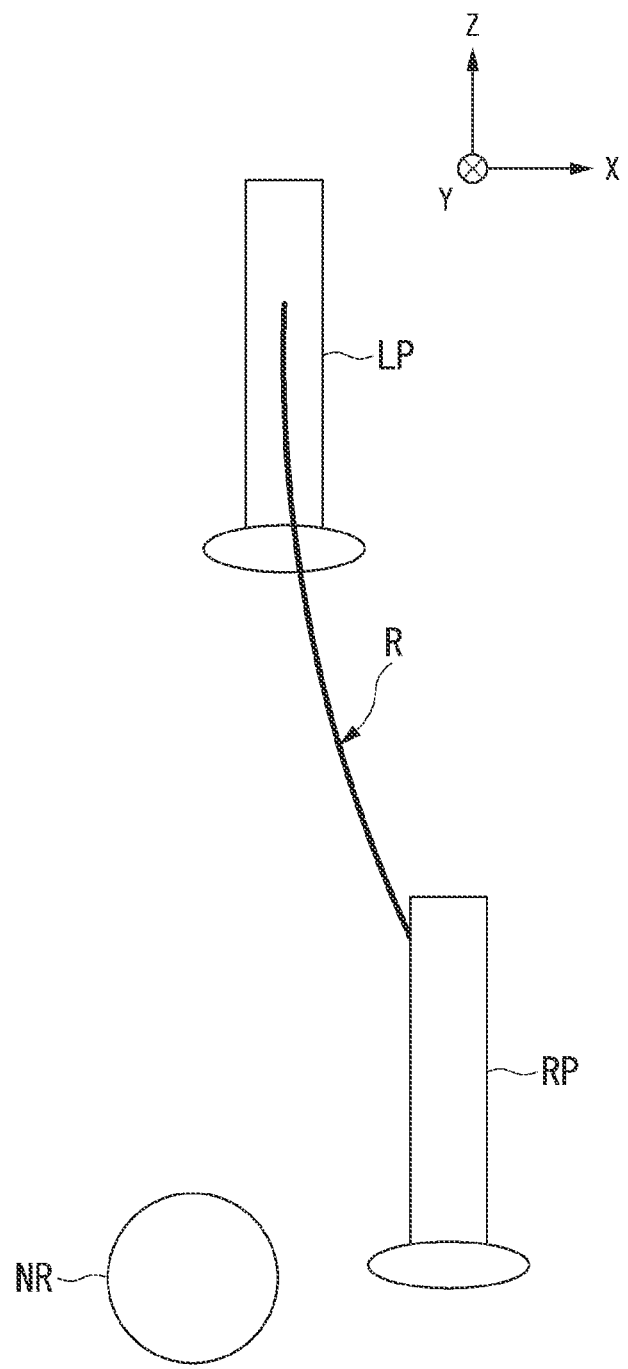
FIG. 4 is a diagram which shows an example of an object recognized by the object recognition unit after the mobile object has moved to the neighboring area.

FIG. 4 is a diagram which shows an example of the object recognized by the object recognition unit 220 after the mobile object 1 has moved to the neighboring area NR. As shown in FIG. 4, as the mobile object 1 moves to the neighboring area NR, the object R captured in a horizontal direction in FIG. 3 is recognized in a vertical direction in FIG. 4. As a result, the number of pixels of the object R in the image captured by the external camera 12 increases, or the intensity of the reflected waves reflected by the object R increases. This makes it possible to recognize the object R, which could not be recognized before the movement to the neighboring area NR.

The travelable area identification unit 240 identifies a travelable area by excluding the object R recognized after the movement to the neighboring area NR from the area of the image captured by the external camera 12, and the traveling control unit 250 generates a trajectory such that the mobile object 1 travels in the identified travelable area. As a result, an object that is difficult to be detected from the front can be detected by the external camera 12 or the radar device 14, and the mobile object 1 can be caused to travel appropriately.

In the description above, the reference object detection unit 230 detects two or more objects whose difference in height is within a predetermined value and whose heights are equal to or greater than a threshold value as reference objects. However, the present invention is not limited to such a configuration. For example, the reference object detection unit 230 may detect two or more objects arranged at the same interval as reference objects, and may detect two or more objects having a predetermined shape (for example, a cylinder or a triangle) as reference objects. A plurality of conditions for detecting reference objects may be combined arbitrarily.

Figure 5:
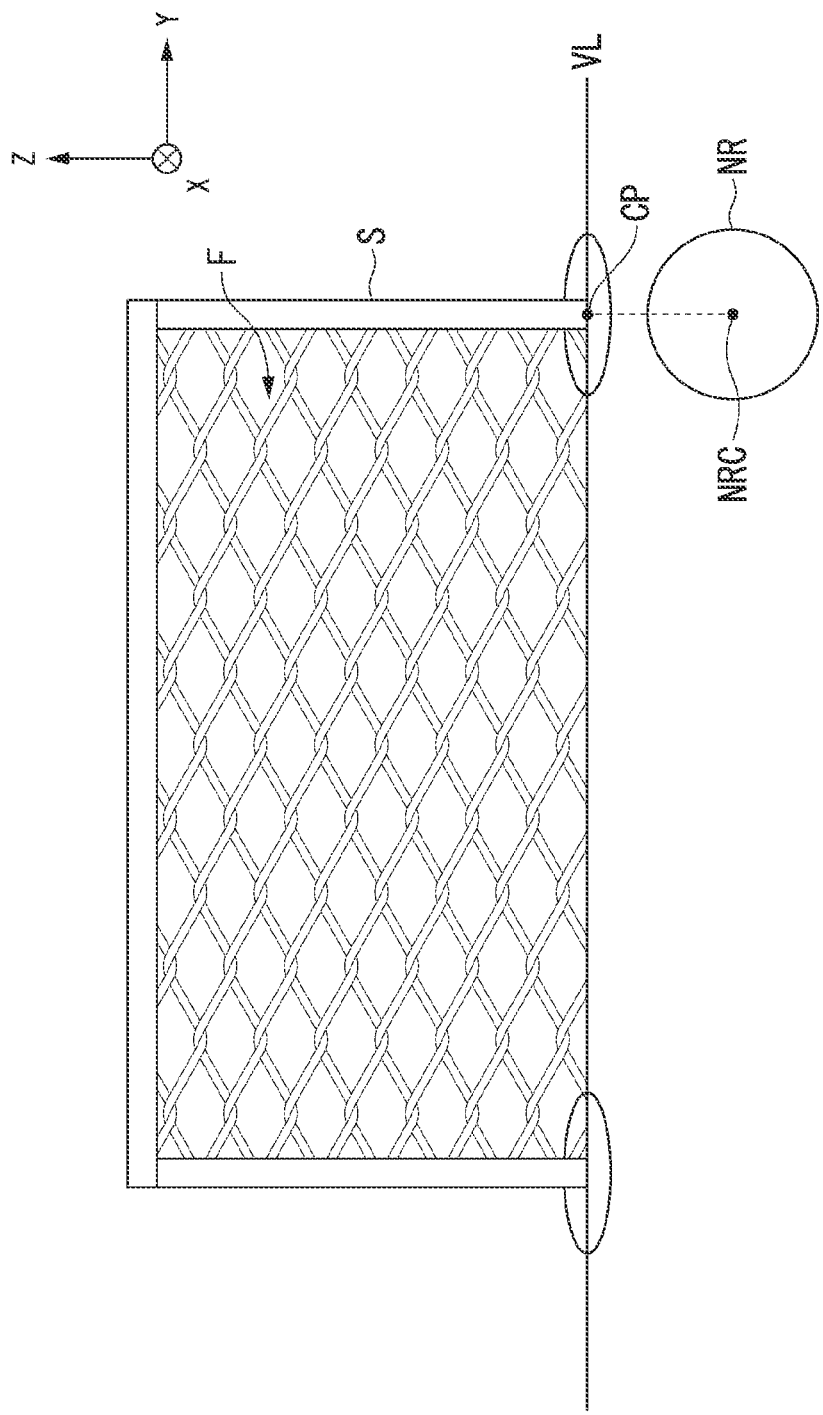
FIG. 5 is a diagram which shows another example of the situation in which object recognition by the object recognition unit fails.

FIG. 5 is a diagram which shows another example of the situation in which object recognition by the object recognition unit 220 fails. FIG. 5 represents an example in which a mesh-shaped fence F and a structure S (a suspension) in which the fence F is hanging are installed in the traveling direction in which the mobile object 1 travels. At this time, the object recognition unit 220 may not be able to recognize the fence F due to the small number of pixels of the fence F in the image captured by the external camera 12 and the small intensity of the reflected waves reflected by the fence F.

For this reason, the reference object detection unit 230 detects, for example, a suspension that is installed on the ground on which the mobile object 1 travels and has a height equal to or higher than a height of the mobile object 1 as a reference object. This is because it is set that the mobile object 1 cannot travel in a hollow space of the suspension when a height of the suspension is less than a height of the mobile object 1. Alternatively, the reference object detection unit 230 collates a reference image such as a fence stored in advance in the storage device 100 with the image captured by the external camera 12 and executes pattern matching processing to detect a reference object.

When the reference object detection unit 230 detects a reference object, the traveling control unit 250 causes the mobile object 1 to move to the vicinity of the detected reference object. For example, in the case of FIG. 5, the traveling control unit 250 first draws a virtual line VL that passes through both pillars of the suspension S, which is the detected reference object, and then causes the mobile object 1 to move to the neighboring area NR including the point NRC where a line segment (for example, 3 m) orthogonal to the virtual line VL is drawn from a center CP of the left or right pillar on the ground to the mobile object 1 side.

When the mobile object 1 moves to the neighboring area NR, the object recognition unit 220 recognizes the object again on the basis of the image captured by the external camera 12 after the mobile object 1 moves and the intensity of the reflected waves received by the radar device 14. In the case of FIG. 5, for example, the object recognition unit 220 uses the external camera 12 to capture an image of the hollow space of the suspension S, or uses the radar device 14 to emit radio waves toward the hollow space of the suspension S. More accurately, while the traveling control unit 250 causes the mobile object 1 to move to the neighboring area NR such that it is oriented obliquely with respect to an extending direction of the object, which is assumed to be present in the hollow space of the suspension S, the object recognition unit 220 captures the image of the hollow space of the suspension S or emits radio waves toward the hollow space.

Figure 6:
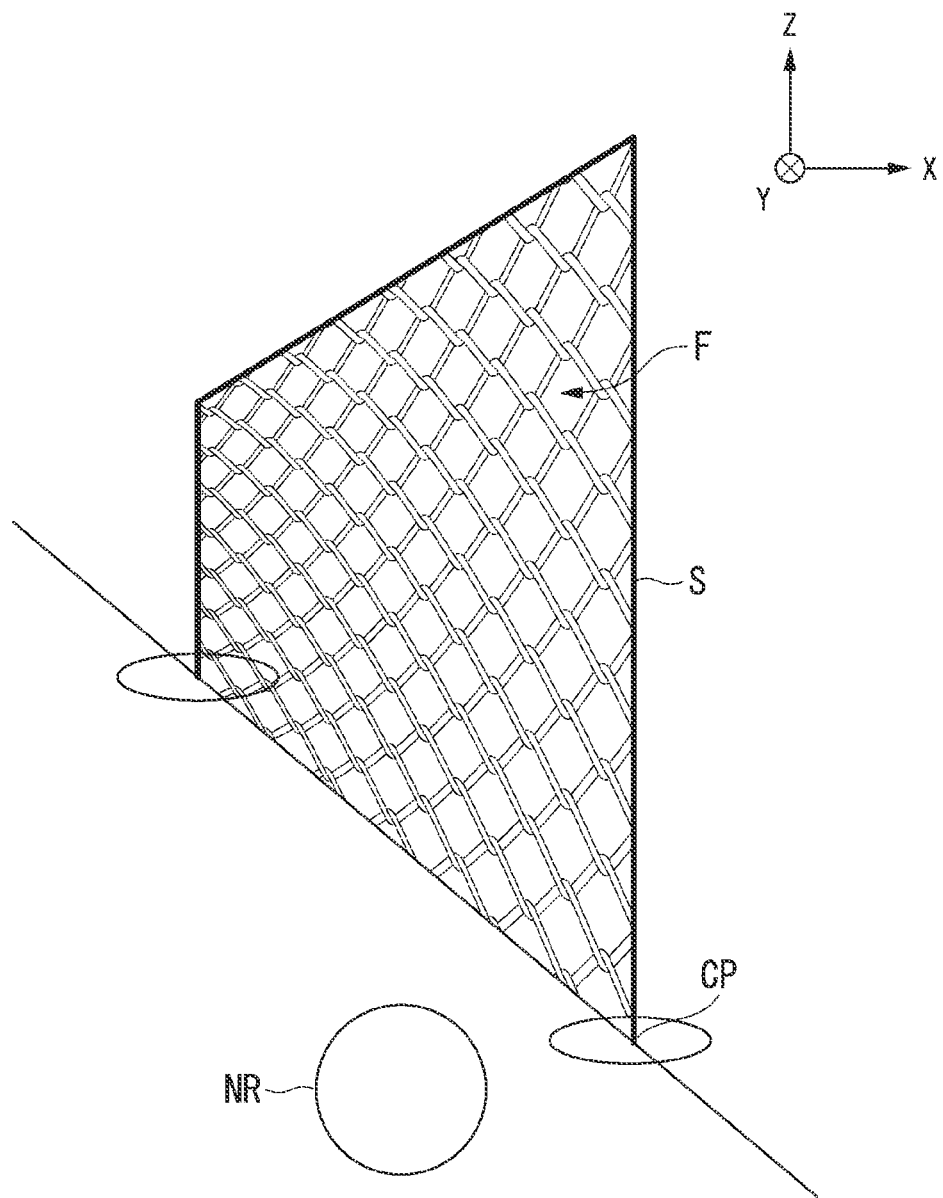
FIG. 6 is a diagram which shows another example of the object recognized by the object recognition unit after the mobile object has moved to the neighboring area.

FIG. 6 is a diagram which shows an example of an object recognized by the object recognition unit 220 after the mobile object 1 has moved to the neighboring area NR. As shown in FIG. 6, as the mobile object 1 moves to the neighboring area NR, the fence F captured in the horizontal direction in FIG. 5 is recognized in the vertical direction in FIG. 6. As a result, the number of pixels of the object R in the image captured by the external camera 12 increases, or the intensity of the reflected waves reflected by the fence F increases. This makes it possible to recognize the fence F that could not be recognized before the movement to the neighboring area NR.

The travelable area identification unit 240 recognizes a travelable area by excluding the fence F recognized after the movement to the neighboring area NR from the area of the image captured by the external camera 12, and the traveling control unit 250 generates a trajectory such that the mobile object 1 travels in the recognized travelable area. As a result, an object that is difficult to be detected from the front can be detected by the external camera 12 or the radar device 14, and the mobile object 1 can be caused to travel appropriately.

In the description above, the reference object detection unit 230 detects a suspension which is installed on the ground on which the mobile object 1 travels and has a height equal to or higher than the height of the mobile object 1 as a reference object. However, the present invention is not limited to such a configuration, and for example, the reference object detection unit 230 may generally detect a suspension having a height greater than or equal to a certain threshold value as a reference object. The plurality of conditions for detecting a reference object may be combined arbitrarily.

Furthermore, in the description above, when the reference object detection unit 230 detects a reference object, the traveling control unit 250 causes the mobile object 1 to move to the vicinity of the detected reference object. However, the present invention is not limited to such a configuration, and the traveling control unit 250 may refer to the map information 110, and cause the mobile object 1 to move to the vicinity of the detected reference object only in situations where it is assumed that an accompanying object accompanying the reference object is highly likely to be present.

Figure 7:
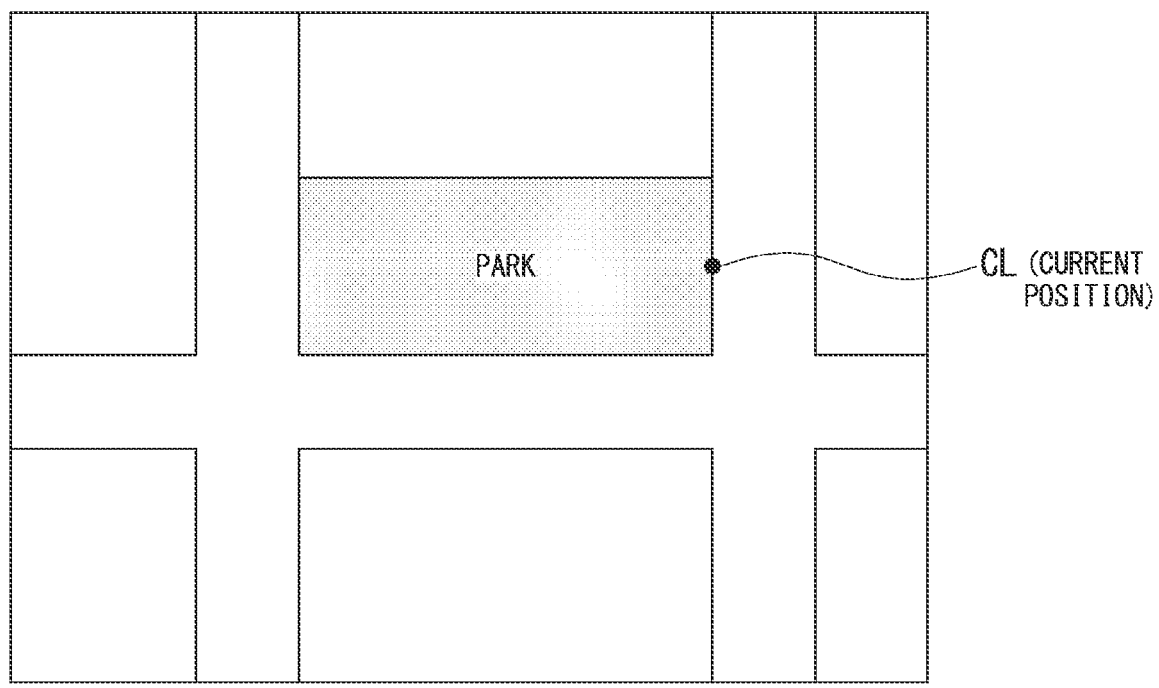
FIG. 7 is a diagram for describing a method of controlling a mobile object using map information when a reference object is detected.

FIG. 7 is a diagram for describing a method of controlling the mobile object 1 by using the map information 110 when the reference object is detected. In FIG. 7, CL indicates a current position of the mobile object 1, which is identified by referring to the map information 110 on the basis of the positional information of the mobile object 1 identified by the positioning device 50. In the map information 110 shown in FIG. 7, it is known that the mobile object 1 is positioned at a boundary between a division representing a park and a division representing a road. In general, a reference object detected at a boundary position between a plurality of divisions in the map information 110 tends to be highly likely to have an accompanying object that is not recognized by the object recognition unit 220.

For this reason, when the reference object is detected and the map information 110 indicates that a detected position of the reference object matches a boundary position of a plurality of areas indicated by the map information 110, the traveling control unit 250 causes the mobile object 1 to move to the vicinity of the reference object. On the other hand, when the reference object is detected and the map information 110 does not indicate that the detected position of the reference object matches the boundary position of the plurality of areas indicated by the map information 110, the traveling control unit 250 does not cause the mobile object 1 to move to the vicinity of the reference object. As a result, it is possible to reduce a possibility of causing the mobile object 1 to move to the vicinity of the reference object even though there is no accompanying object.

[Flowchart]

Figure 8:
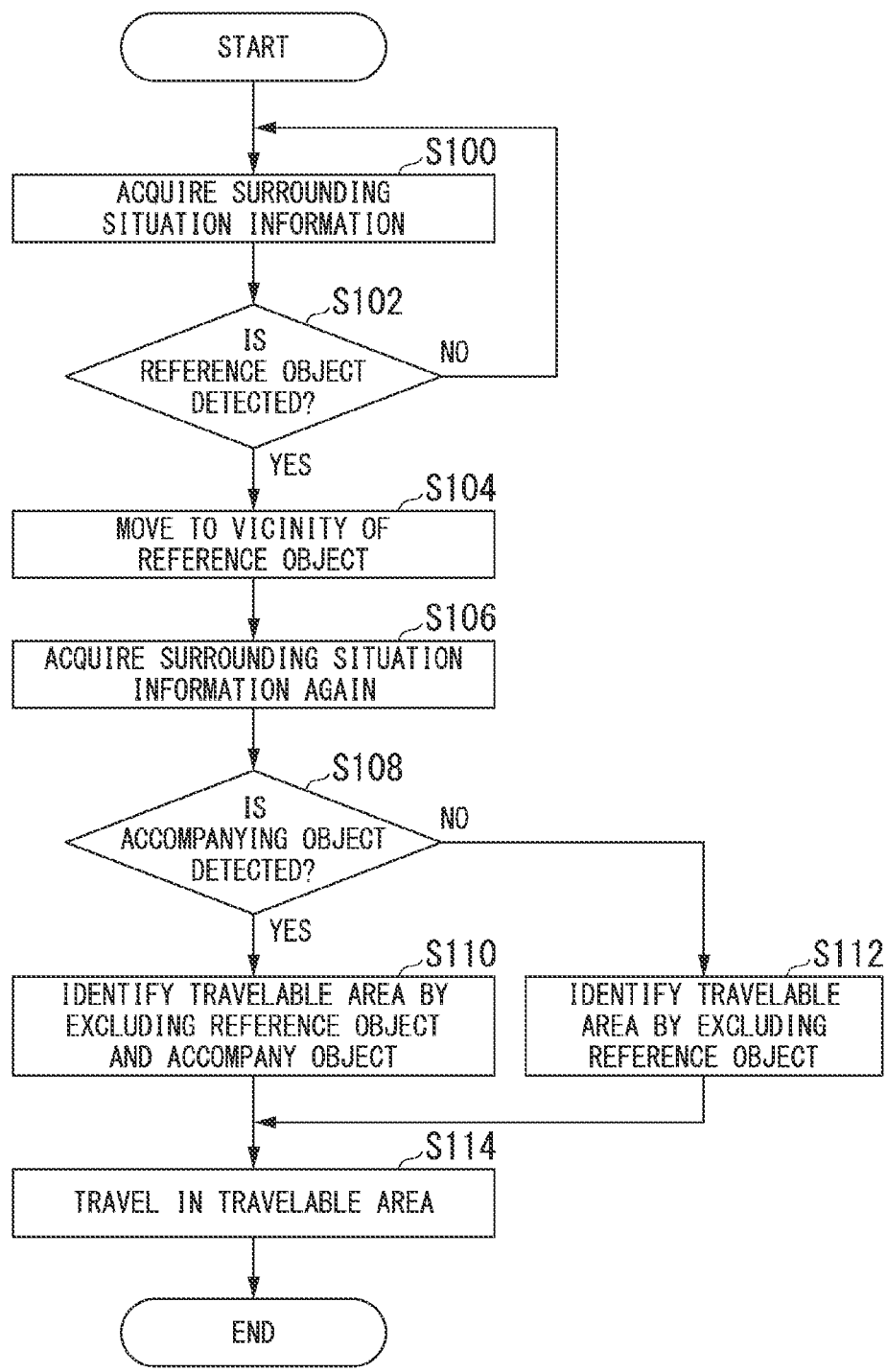
FIG. 8 is a flowchart which shows an example of a flow of processing executed by the control device.

Next, the flow of processing executed by the control device 200 will be described with reference to FIG. 8. FIG. 8 is a flowchart which shows an example of the flow of processing executed by the control device 200. First, the object recognition unit 220 detects an object present in the vicinity of the mobile object 1 on the basis of the image captured by the external camera 12, the intensity of the reflected waves received by the radar device 14, and the like, and acquires it as surrounding situation information (step S100). Next, the reference object detection unit 230 determines whether a predetermined reference object present in the traveling direction of the mobile object 1 is detected on the basis of the acquired surrounding situation information (step S102).

When it is not determined that the reference object is detected, the control device 200 returns the processing to step S100. On the other hand, when it is determined that the reference object is detected, the traveling control unit 250 causes the mobile object 1 to move to the vicinity of the detected reference object (step S104). Next, the object recognition unit 220 detects an object present in the vicinity of the mobile object 1 on the basis of the image captured by the external camera 12 and the intensity of the reflected waves received by the radar device 14, and acquires it as surrounding situation information again (step S106).

Next, the travelable area identification unit 240 determines whether an accompanying object accompanying the detected reference object is detected on the basis of the surrounding situation information reacquired by the object recognition unit 220 (step S108). When it is determined that the accompanying object is detected, the travelable area identification unit 240 identifies a travelable area by excluding the detected reference object and the accompanying object from the area of the image captured by the external camera 12 (step S110). On the other hand, if it is not determined that the accompanying object is detected, the travelable area identification unit 240 identifies the travelable area by excluding the detected reference object from the area of the image captured by the external camera 12 (step S112).

Next, the traveling control unit 250 generates a trajectory for the mobile object 1 to travel in the identified travelable area, and causes the mobile object 1 to travel along the generated trajectory (step S114). As a result, processing of this flowchart ends.

Figure 9:
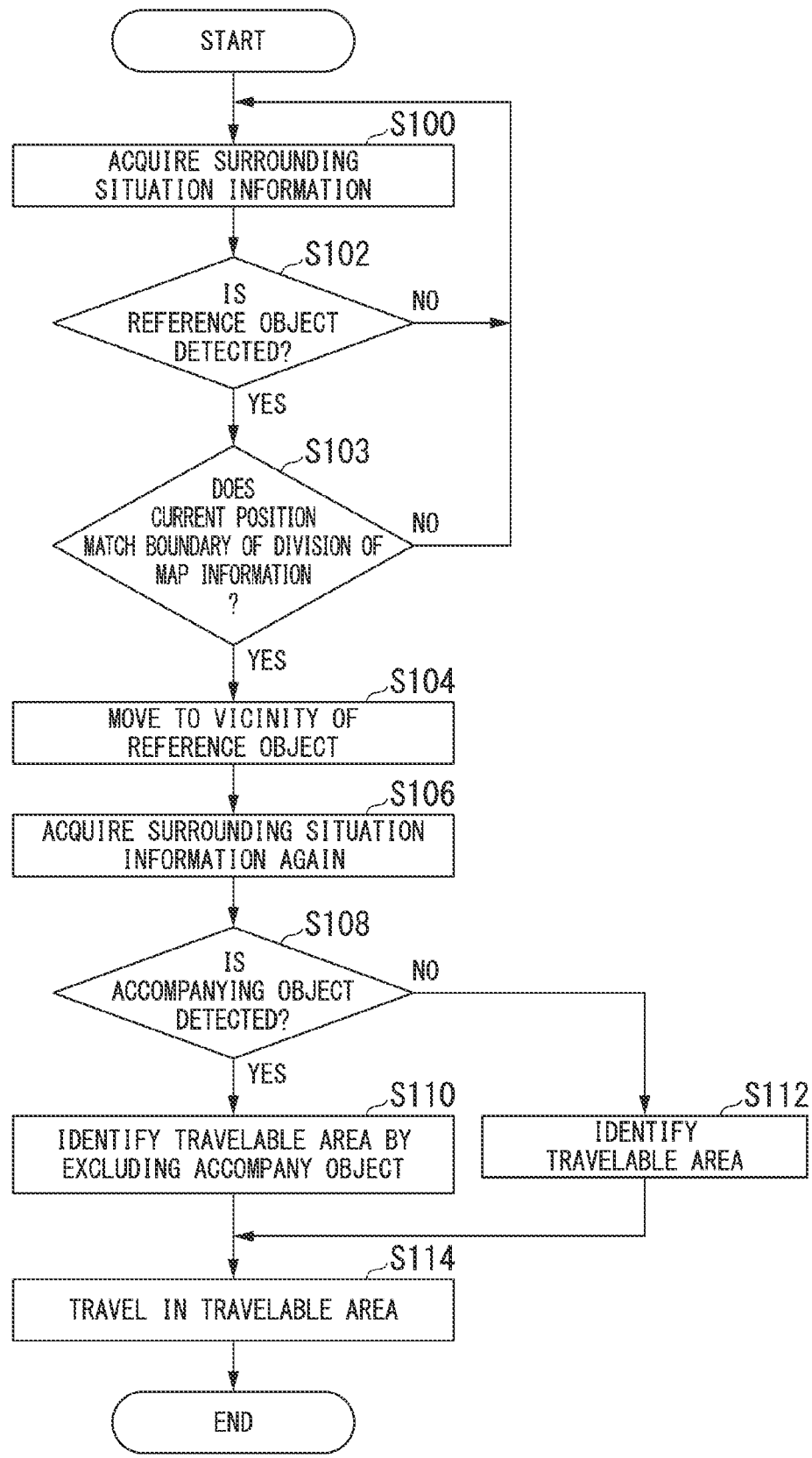
FIG. 9 is a flowchart which shows another example of the flow of processing executed by the control device.

FIG. 9 is a flowchart which shows another example of the flow of processing executed by the control device 200. Hereinafter, description of the same processing as in the flowchart of FIG. 8 will be omitted.

In the processing of step S102, when it is determined that the reference object is detected, the traveling control unit 250 refers to the map information 110 and determines whether a current position of the mobile object 1 matches the boundary position of the plurality of divisions in the map information 110 (step S103).

When it is determined that the current position of the mobile object 1 does not match the boundary position of the plurality of divisions in the map information 110, the control device 200 returns the processing to step S100. On the other hand, when it is determined that the current position of the mobile object 1 matches the boundary position of the plurality of divisions in the map information 110, the control device 200 advances the processing to step S104. Other processing is the same as the processing in the flowchart of FIG. 8. As a result, it is possible to reduce the possibility of moving the mobile object 1 to the vicinity of the reference object even though the accompanying object is not present.

In the embodiment described above, an example has been described in which the reference object is a structure such as a pole or a fence, and the accompanying object is a mesh portion of a rope or a fence. However, the present invention is not limited to such a configuration, and more generally, by typifying a combination of an object recognizable even from a relatively long distance and an object recognizable only at a relatively short distance, the present invention can be applied to various reference objects and the combination of reference objects.

According to the embodiment described above, when a reference object is detected in the vicinity of the mobile object 1, the mobile object 1 is moved to the vicinity of the reference object, the surrounding situation information of the reference object is acquired again at a position after the movement, and when an accompanying object accompanying the reference object is detected, the accompanying object is excluded from the travelable area of the mobile object 1. As a result, it is possible to perform assistance in detecting an object with higher accuracy.

The embodiment described above can be expressed as follows.

A control device mounted on a mobile object includes a storage medium that stores an instruction readable by a computer, and a processor connected to the storage medium, and the processor executes an instruction readable by the computer, thereby acquiring surrounding situation information indicating a surrounding situation of the mobile object recognized by an object recognition device mounted on a mobile object, detecting a predetermined reference object present in a traveling direction of the mobile object on the basis of the surrounding situation information, identifying a travelable area of the mobile object on the basis of the surrounding situation information, controlling traveling of the mobile object such that the mobile object travels in the travelable area, causing, by the traveling control unit, the mobile object to move closer to the reference object when the reference object is detected, and detecting, by the travelable area identification unit, an accompanying object accompanying the reference object on the basis of the surrounding situation information recognized by the object recognition device after the mobile object moves closer to the reference object, and identifying the travelable area by excluding the reference object and the accompanying object.

As described above, a mode for implementing the present invention has been described using the embodiments, but the present invention is not limited to such embodiments at all, and various modifications and replacements can be added within a range not departing from the gist of the present invention.

What is claimed is:

1. A control device mounted on a mobile object comprising:
   a storage medium configured to store an instruction readable by a computer, and
   a processor connected to the storage medium,
   wherein the processor executes the instruction readable by the computer, thereby
   acquiring surrounding situation information indicating a surrounding situation of a mobile object recognized by an object recognition device mounted on the mobile object,
   detecting a predetermined reference object present in a traveling direction of the mobile object on the basis of the surrounding situation information,
   identifying a travelable area of the mobile object on the basis of the surrounding situation information,
   controlling traveling of the mobile object such that the mobile object travels in the travelable area,
   causing the mobile object to move closer to the reference object when the reference object is detected, and
   detecting an accompanying object accompanying the reference object on the basis of the surrounding situation information recognized by the object recognition device after the mobile object moves closer to the reference object, and identifying the travelable area by excluding the reference object and the accompanying object.

2. The control device mounted on a mobile object according to claim 1,
   wherein, when the reference object is detected and the accompanying object is present, the processor causes the mobile object to move to the vicinity of the reference object, which is a distance range in which the accompanying object is recognizable by the object recognition device by using the reference object as a reference position.

3. The control device mounted on a mobile object according to claim 1,
   wherein the reference object is at least two objects that are installed on a ground on which the mobile object travels, whose difference in height is within a predetermined value, and whose heights are equal to or greater than a threshold value.

4. The control device mounted on a mobile object according to claim 3,
   wherein, when at least two objects whose difference in height is within a predetermined value and whose heights are equal to or greater than a threshold value are detected as the reference object, the processor causes the mobile object to move closer to the reference object, and
   the processor identifies the travelable area on the basis of surrounding recognition information obtained by recognizing a space between the at least two or more objects at a position to which the mobile object has moved closer to the reference object.

5. The control device mounted on a mobile object according to claim 4,
   wherein, when at least two or more objects whose difference in height is within a predetermined value and whose heights are equal to or greater than a threshold value are detected as the reference object, the processor causes the mobile object to move closer to the reference object such that the mobile object is oriented obliquely with respect to an extending direction of the accompanying object, which is assumed to be present between the two or more objects.

6. The control device mounted on a mobile object according to claim 1,
   wherein the reference object is a suspension which is installed on the ground on which the mobile object travels and has a height equal to or higher than a height of the mobile object.

7. The control device mounted on a mobile object according to claim 6,
wherein, when a suspension having a height equal to or higher than the height of the mobile object is detected as the reference object, the processor identifies the travelable area on the basis of surrounding recognition information obtained by recognizing a hollow space of the suspension at a position to which the mobile object has moved closer to the reference object.

8. The control device mounted on a mobile object according to claim 1,
wherein, when the reference object is detected and map information held by the mobile object shows that a detection position of the reference object matches a boundary position of a plurality of areas indicated by the map information, the processor causes the mobile object to move closer to the reference object.

9. A control method comprising:
by a computer of a mobile object,
processing of acquiring surrounding situation information indicating a surrounding situation of a mobile object recognized by an object recognition device mounted on the mobile object;
processing of detecting a predetermined reference object present in a traveling direction of the mobile object on the basis of the surrounding situation information;
processing of identifying a travelable area of the mobile object on the basis of the surrounding situation information;
processing of controlling traveling of the mobile object such that the mobile object travels in the travelable area;
processing of causing the mobile object to move closer to the reference object when the reference object is detected; and
processing of detecting an accompanying object accompanying the reference object on the basis of the surrounding situation information recognized by the object recognition device after the mobile object moves closer to the reference object, and identifying the travelable area by excluding the reference object and the accompanying object.

10. A computer-readable non-transitory storage medium that stores a program causing a computer of a mobile object to execute:
processing of acquiring surrounding situation information indicating a surrounding situation of a mobile object recognized by an object recognition device mounted on the mobile object;
processing of detecting a predetermined reference object present in a traveling direction of the mobile object on the basis of the surrounding situation information;
processing of identifying a travelable area of the mobile object on the basis of the surrounding situation information;
processing of controlling traveling of the mobile object such that the mobile object travels in the travelable area;
processing of causing the mobile object to move closer to the reference object when the reference object is detected; and
processing of detecting an accompanying object accompanying the reference object on the basis of the surrounding situation information recognized by the object recognition device after the mobile object moves closer to the reference object, and identifying the travelable area by excluding the reference object and the accompanying object.

* * * * *